Patented Sept. 26, 1939

2,174,072

UNITED STATES PATENT OFFICE 2,174,072

DYESTUFFS OF THE ANTHRAQUINONE OXAZOLE SERIES

Georg Kränzlein, Frankfort-on-the-Main, and Hans Schlichenmaier, Kelkheim in Taunus, Germany, assignors to General Aniline Works, Inc., New York, N. Y., a corporation of Delaware No Drawing. Application August 2, 1935, Serial No. 34,473. In Germany August 25, 1934

5 Claims. (Cl. 260—307)

The present invention relates to dyestuffs of the anthraquinone oxazole series which may be after-chromed.

We have found that dyestuffs of the anthraquinone series which may be after-chromed and which have very good fastness properties are obtainable by causing sulfuric acid containing free sulfur trioxide to act upon 4-aminoanthraquinone-1.2-(N)-aryl-oxazoles. The oxazole is advantageously treated in the heat, at temperatures between about 60° C. and about 160° C., with fuming sulfuric acid containing about 10% to about 100%, advantageously 20% to 30%, of free $SO_3$. The higher the content of $SO_3$ in the sulfuric acid, the lower may be the temperature. For moderating the reaction, boric acid may be added to the reaction mixture. Compounds are thus obtained which dissolve easily in water to an intense violet solution; by addition of alkali the violet color of the solution turns blue. The constitution of the new compounds which are obtainable according to the present invention is not known. They are probably anthraquinone-oxazole-sulfonic acids which contain probably one or more hydroxy groups and may be characterized by the following formula:

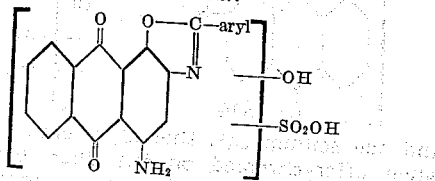

wherein the position and the number of the hydroxyl and sulfo groups in the molecule is not known, or the salts thereof. The dried dyestuffs are light to dark brown powders. By dissolving them in water and salting them out, for instance, by means of sodium chloride solution they may be converted into their sodium salts. These salts form in the dry state black-brown powders which have a much more intense color than the free acids. Also the alkali salts of the dyestuffs are rather easily soluble in water. They dissolve in concentrated sulfuric acid to a yellowish-red solution.

The new dyestuffs dye wool violet tints. By treating the violet acid dyeings with agents which yield chromium there are obtained greenish blue very level tints of very good fastness to washing, to fulling and to light. It is surprising that according to the described method dyestuffs capable of being after-chromed may be obtained from aminoanthraquinone-oxazoles.

The following examples serve to illustrate the invention but they are not intended to limit it thereto; the parts are by weight unless stated otherwise:

(1) 6 parts of 4-aminoanthraquinone-1.2-(N)-phenyloxazole of the formula (obtainable according to the process of application Serial No. 12,300 filed March 21, 1935, in the name of Georg Kränzlein, Hans Schlichenmaier and Ludwig Wilhelm Berlin for "Oxazole dyestuffs of the anthraquinone series and a process of preparing them," now matured into Patent 2,123,834, granted July 12, 1938) are dissolved in 180 parts by volume of fuming sulfuric acid containing 20 per cent. of sulfuric anhydride; the whole is then heated for about 2 to 3 hours at 90-100° C. The product is poured on about 250 parts of ice. A reddish-brown precipitate separates which increases with the cooling of the reddish-brown solution. The precipitate is filtered with suction, dissolved in as small as possible a quantity of warm water and again precipitated with sodium chloride solution from the intensely violet solution. When dried, the dyestuff thus obtained, probably in the form of its sodium salt, is a black-brown powder which dyes wool violet tints. By treating the violet dyeing with an agent yielding chromium a greenish blue dyeing of very good levelling power and very good fastness to washing, to fulling and to light is obtained.

(2) 6 parts of the above oxazole are treated for 4-5 hours at 90-100° C. with 160 parts by volume of fuming sulfuric acid containing 20 per cent. of sulfuric anhydride. The mixture is poured on ice, the red-brown precipitate which has separated after cooling is filtered with suction and washed with hydrochloric acid of about 15 per cent. strength. After drying, it is a light brown powder which dissolves easily in water to an intensely bluish-violet solution. The dyestuff dissolves in concentrated sulfuric acid to a yellowish-red solution. When wool is dyed from an acid bath and after-chromed, tints and properties of fastness are obtained which are similar to those described in Example 1.

(3) 2 parts of the above amino-oxazole are dissolved with 3 parts of crystallized boric acid in 60 parts by volume of fuming sulfuric acid containing 30 per cent. of sulfuric anhydride and the whole is heated for about 1 hour at about 90° C. The product is then poured on about 100 parts of ice and a red-brown precipitate is thus obtained which is filtered with suction, washed with dilute hydrochloric acid and dried. It is then a light-brown powder, having tintorial properties similar to those of the products obtainable according to Examples 1 and 2.

(4) 2 parts of 4-aminoanthraquinone-1:2-paratolyloxazole are warmed in the presence of 3 parts of boric acid with 30 parts by volume of fuming sulfuric acid containing 30 per cent. of sulfuric anhydride for one hour on the water bath. By working the product up as described in Example 3, a dark brown powder is obtained, which dissolves in water to an intensely bluish-violet color and dyes wool violet tints.

(5) By saponifying the anthraquinone-oxazole, obtainable from 1-hydroxy-2.4-diaminoanthraquinone and meta-chlorobenzoyl-chloride by boiling the components in nitrobenzene, the corresponding amine is obtained which when recrystallized from alpha-chloronaphthalene forms red, needle-shaped crystals melting at 314° C. 40 parts of this amine are heated for 1½ hours at 150° C. in 15 times their weight of fuming sulfuric acid containing 20 per cent of sulfuric anhydride. The solution is then poured on a small quantity of ice, the violet precipitate is filtered with suction, dissolved again in hot water and the disulfonic acid of the dyestuff is precipitated in the form of its potassium salt. When after-chromed on the fiber the dyestuff yields bluish-gray, even dyeings of very good fastness properties.

(6) The anthraquinone-oxazole, obtainable from 1-hydroxy-2.4-diaminoanthraquinone and meta-methoxy-benzoylchloride by boiling the components in nitrobenzene, is saponified with sulfuric acid and yields an amine which, when recrystallized from dichlorobenzene melts at 325° C. This amine is heated for 1½ hours at 95° C. to 100° C. in 15 times its weight of fuming sulfuric acid containing 20 per cent of sulfuric anhydride and yields, when worked up as described in the preceding example, a dyestuff which, when after-chromed on the fiber, dyes wool a blue-gray tint of good tinctorial properties and very good fastness to light.

(7) The anthraquinone-oxazole, obtainable from 1-hydroxy-2.4-diaminoanthraquinone and ortho-chlorobenzoylchloride by boiling the components in nitrobenzene, is saponified with sulfuric acid and the thus obtained amine, melting at 308° C., is sulfonated for about 1 hour at 130° C. as described above. The dyestuff which has been purified by way of the sodium salt dyes wool, when after-chromed on the fiber, grayish blue tints of the same good fastness properties as those of the dyestuffs obtainable according to the preceding examples.

We claim:

1. A compound of the group consisting of the compounds of the formula

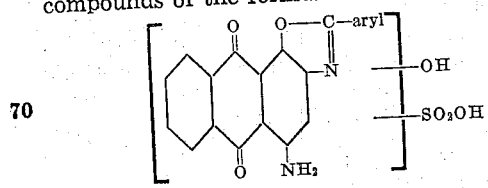

wherein aryl comprises radicals of the group consisting of phenyl and phenyl substituted by non-cyclic monovalent substituents and the position of the hydroxyl and sulfo groups in the molecule is not known, and the alkali metal salts thereof.

2. A compound of the group consisting of the compounds of the formula

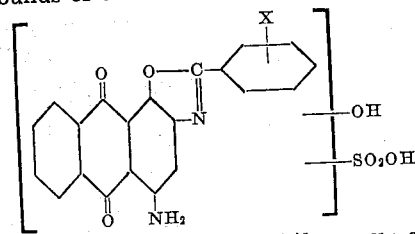

wherein X means a member of the group consisting of hydrogen, halogen, alkoxy and alkyl, and the position of the hydroxyl and sulfo groups in the molecule is not known, and the alkali metal salts thereof.

3. A compound of the group consisting of the compound of the formula

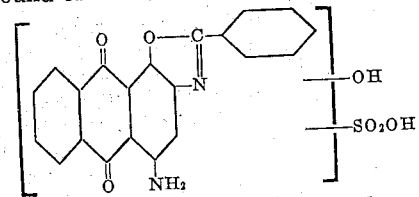

wherein the position of the hydroxyl and sulfo groups in the molecule is not known, and the sodium salt thereof, forming a black-brown powder which dyes wool violet tints which, on being treated with an agent yielding chromium, change to greenish-blue tints of very good leveling power and very good fastness to washing, to fulling and to light.

4. A compound of the group consisting of the compound of the formula

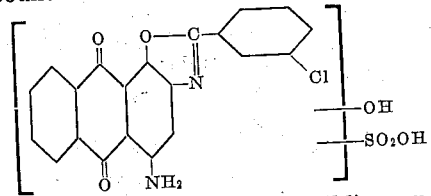

and the sodium salt thereof, yielding on wool, when after-chromed on the fiber, bluish-gray even dyeings of very good fastness properties.

5. A compound of the group consisting of the compound of the formula

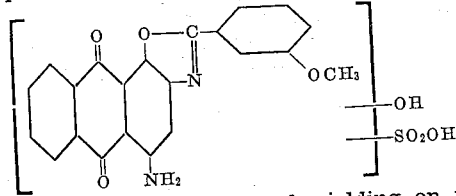

and the sodium salt thereof, yielding on wool, when after-chromed on the fiber, a blue-gray tint of good tinctorial properties and very good fastness properties.

GEORG KRÄNZLEIN.
HANS SCHLICHENMAIER.